United States Patent [19]

Modla

[11] Patent Number: 4,731,864

[45] Date of Patent: Mar. 15, 1988

[54] PHOTOGRAPHIC CAMERA SIMULATION SYSTEMS WORKING FROM COMPUTER MEMORY

[75] Inventor: Andrew A. Modla, Bucks County, Pa.

[73] Assignee: RCA Corporation, Princeton, N.J.

[21] Appl. No.: 831,561

[22] Filed: Feb. 21, 1986

[51] Int. Cl.[4] .................... G06K 9/00; H04N 1/387
[52] U.S. Cl. .................................. 382/54; 382/41;
   358/104; 358/93; 364/522; 364/518
[58] Field of Search ............... 358/103, 104, 109, 125;
   364/522, 518, 521; 382/41, 54

[56] References Cited

U.S. PATENT DOCUMENTS

| 4,106,218 | 8/1978 | Polstorf | 358/104 |
|---|---|---|---|
| 4,209,832 | 6/1980 | Gilham et al. | 358/104 |
| 4,348,186 | 9/1982 | Harvey et al. | 434/44 |
| 4,384,338 | 5/1983 | Bennett | 358/104 |
| 4,463,380 | 7/1984 | Hooks, Jr. | 358/104 |
| 4,570,233 | 2/1986 | Yan et al. | 358/104 |
| 4,684,970 | 8/1987 | Oxley | 364/522 |
| 4,687,326 | 8/1987 | Corby, Jr. | 358/125 |

Primary Examiner—Leo H. Boudreau
Assistant Examiner—Steven W. Brim
Attorney, Agent, or Firm—Eugene M. Whitacre; Paul J. Rasmussen; Eric P. Herrmann

[57] ABSTRACT

A camera field-of-view is mapped with full depth-of-focus into electronic memory. Data concerning image intensities at selected points in image space are stored, along with data concerning the distances between the camera and these points in image space. Images with any focus and depth-of-focus can be generated by scanning the electronic memory during a reading thereof and convolving the data concerning image intensity with an adjustable-bandwidth low-pass spatial filter. The bandwidth of that filter is adjusted dependent on the data concerning distances between camera and points in image space. This image storage and image retrieval procedure conserves the size of electronic memory required to store and retrieve images with any focus and depth-of-focus.

4 Claims, 4 Drawing Figures

PHOTOGRAPHIC CAMERA SIMULATION SYSTEMS WORKING FROM COMPUTER MEMORY

The present invention relates to the storage of pictorial information in computer memories and, more particularly, to the withdrawal of the pictorial information from computer memories so as to permit focus and depth-of-focus to be adjusted electrically.

BACKGROUND OF THE INVENTION

In simulators (such as those used for aircraft pilot training), in sophisticated computer graphics, in sophisticated video games, and in television broadcast studio equipment it is desirable to retrieve pictorial information from computer memory and to electrically adjust the focus and depth-of-focus of that pictorial information. (Depth-of-focus is alternatively called depth-of-field.) One could provide for such photographic camera simulation by photographing a field of view with, practically speaking, all combinations of focal length and aperture possible with a given camera lens, converting the photographs to electric signal descriptions, and storing the electric signal descriptions in computer memory. Excessive computer memory capability is required for separately storing the hundreds of pictures with reasonably high resolution, particularly if they are in full color.

E. H. Adelson in U.S. patent application Ser. No. 611,962 filed May 18, 1984 entitled "IMPROVED DEPTH-OF-FOCUS IMAGING PROCESS METHOD", now U.S. Pat. No. 4,661,986 and assigned to RCA Corporation describes a method of generating electric signal descriptions of a field of view, with depth-of-focus extended beyond the normal capability of the camera lens. Adelson derives an improved-focus two-dimensional image from an assemblage of separately focused two-dimensional images of the same three-dimensional field of view, each of which images is sampled with the same spatial resolution in each direction in the two-dimensional image plane. These images with depth-of-focus limited by the lens capabilities are each subjected to two-dimensional spatial-frequency spectrum analysis, with each subspectrum being an octave or smaller in spatial frequency. Samples of given spatial frequency and location, each drawn from a different one of the assemblage of separately-focused 2-D images, are compared with each other to select the largest of the samples. An electric signal description of an extended depth-of-focus image is then synthesized from the selected samples. This procedure and the pyramid-based spatial-frequency spectrum analysis techniques used to implement it are explained in greater detail by J. M. Ogden, E. H. Adelson, J. R. Bergen and P. J. Burt in their *RCA ENGINEER*, Vol. 30, No. 5, Sept./Oct. 1985 article "Pyramid-based Computer Graphics", appearing on pages 4–15 of that publication and incorporated herein by reference.

Adelson also describes in his patent application Ser. No. 611,962 the use of two portions of computer memory mapping the same image space, the first portion storing at each location therein a full depth-of-focus sample of the image and the second portion storing the distance of the principal axis of the camera lens from the object plane of that image sample. This image memory organization is used to implement three-dimensional microscopy.

A similar image memory organization, the present inventor points out, allows for the efficient storage of all the information necessary to re-create with reasonable accuracy the hundreds of photographs of a field of view taken with (practically speaking) all combinations of focal length and optical aperture possible with a given camera lens. Rather than a multiplicity of similar-size portions of image memory being taken up to store electrical descriptions of respective ones of these photographs, only two portions of image memory of such size are used. The first portion of image memory stores full depth-of-focus picture element (or "pixel") samples for each of the points in two-dimensional image space. The second portion of image memory stores all the information from which one may determine, for each of the pixels in two-dimensional image space, the distance between the principal axis of the camera lens and the object plane from which the pixel is obtained.

SUMMARY OF THE INVENTION

A simulation of the electrical photography of the scene stored in such image memory is made in accordance with the present invention by convolving each pixel sample in the first portion of image memory and a low-pass spatial filter function of variable spatial bandwidth. This blurs objects outside the object plane in best focus on the image plane of the camera lens being simulated. The spatial bandwidth of the low-pass filter function is inversely related to the distance between the object plane for that pixel sample and the object plane in best focus in the image plane of the camera lens being simulated. The smaller the spatial bandwidth of the low-pass filter, the fewer finer details of the image appear in the filter response. This distance is calculated using the information stored in the second portion of image memory at a location mapping the same point in image space as the location in the first portion of image memory from which the pixel sample is taken. The spatial bandwidth of the low-pass filter function is also inversely related to a selected value of lens aperture. The greater the selected value of lens aperture, the shallower the depth-of-focus is. In preferred embodiments of the invention the eclipsing of the blur of background pixels by other pixels is simulated.

THE DRAWING

DETAILED DESCRIPTION

Figure 1:
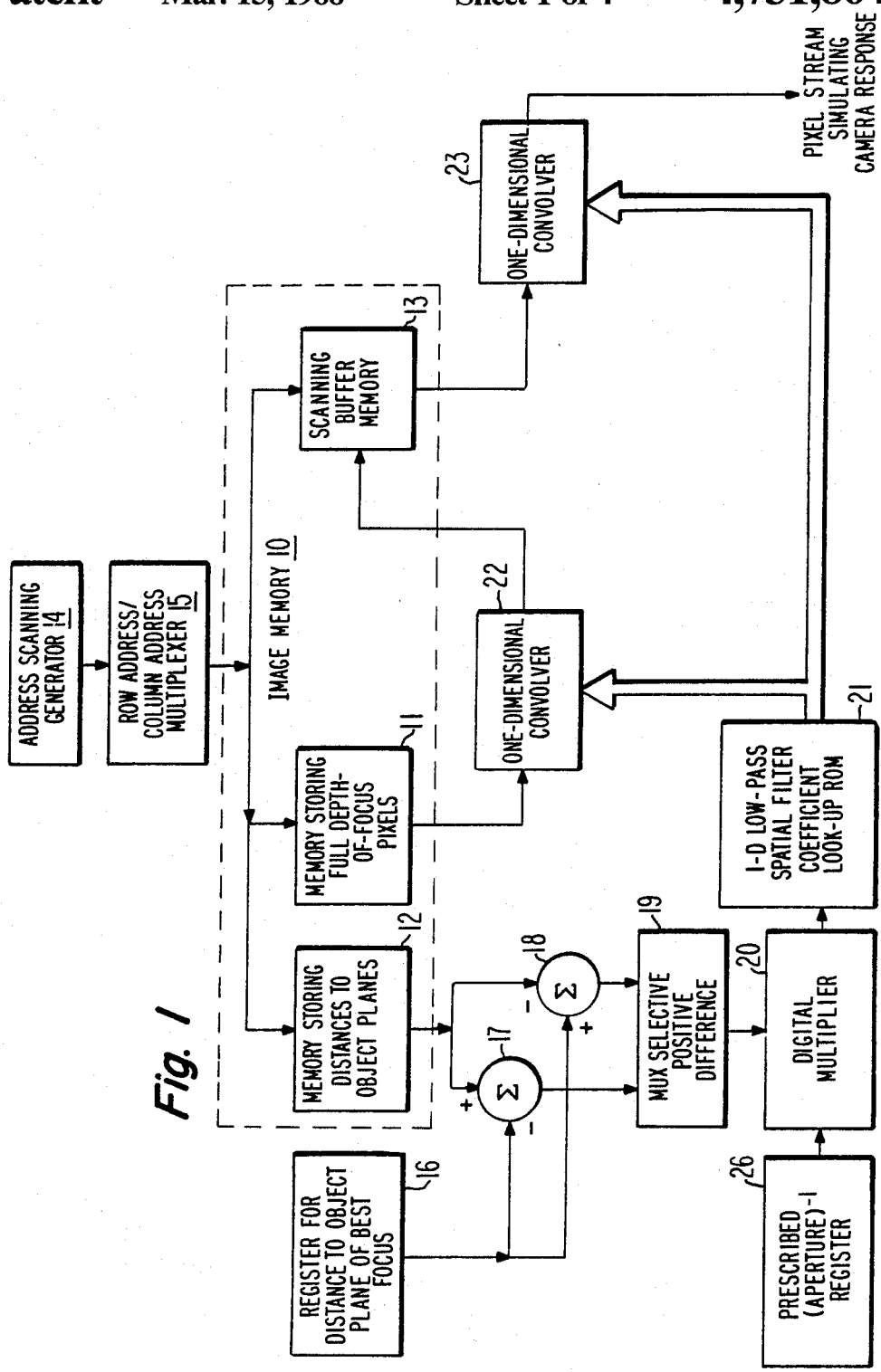
FIG. 1 is a block diagram of a camera simulation system embodying the invention employing separable, two-dimensional low-pass spatial filtering.

In FIG. 1 image memory 10 comprises three portions: a first portion 11 serving as memory for storing full depth-of-focus pixels, a second portion 12 serving as memory for storing distances between the principal axis of the camera lens and the various object planes in the camera field-of-view, and a third portion 13 serving as buffer memory for scanning. Each of the portions 11, 12, 13 of image memory 10 is bit-map-organized, which is to say its storage locations conformally map locations in image space. Row and column addressing of the portions 11, 12, 13 of image memory 10 correspond to translation in first and second orthogonal directions in two-dimensional image space. Two-dimensional image space may be defined in orthogonal Cartesian coordinates, which is the most usual practice, or it may be defined in other orthogonal coordinates such as polar coordinates.

One may view image memory 10 as a memory having a number of storage locations addressed in two orthogonal spatial dimensions, each addressable storage location in image memory 10 storing a digital word. First, second and third portions of each of these words are stored in portions 11, 12 and 13 of image memory 10. The first portions of these digital words indicate the intensities of full depth-of-focus pixels, and the second portions of these digital words indicate the distances between the principal axis of the camera lens and the object planes of which these pixels provide a sampled description. The third portions of these words indicate the intensities of pixels which have full depth-of-focus only parallel to one address coordinate axis in space. The third portions of these words are derived from the information stored in the first and second portion of the digital words stored in image memory 10, the derivation being made in spatial filtering procedures to be described.

A separable, two-dimensional low-pass spatial filtering procedure is followed in the FIG. 1 camera simulation system. An address scanning generator 14 generates, as its output, sequential numbers during each of the two successive convolutions involved in the separable filtering procedure. A row-address/column-address multiplexer 15 selects the more significant bits of scanning generator 14 output to serve as column addresses for portions 11, 12, 13 of image memory 10 during the first convolution. Multiplexer 15 during the first convolution selects the more significant bits of scanning generator 14 output to serve as column addresses for portions 11, 12, 13 of image memory 10; and multiplexer 15 selects the less significant bits of scanning generator 14 output to serve as row addresses for portions 11, 12, 13 of image memory 10. Thereafter, during the second convolution multiplexer 15 selects as row addresses the more significant bits of scanning generator 14 output and selects as column addresses the less significant bits of scanning generator 14 output. Accordingly, the first and second convolutions are carried out orthogonally in image space.

Register 16, which may comprise just a multi-bit latch, stores the prescribed distance between the principal axis of the camera lens being simulated and the object plane in best focus in the image plane of the camera lens being simulated. Register 26, which may also comprise just a multi-bit latch, stores the reciprocal of the prescribed optical aperture for the camera lens system being simulated. This is a number directly related to the f-stop of the camera lens system being simulated. These prescribed values and the distance information stored in portion 12 of image memory 10 are used to control the spatial bandwidth of the low-pass spatial filtering used in the convolution procedures.

To this end, the absolute value of the difference between the distance stored in register 16 and the distance stored in the presently addressed storage location of portion 12 of image memory 10 is calculated. This absolute-value difference is the distance that an object plane in the camera field-of-view is from the object plane in best focus in the image plane of the camera lens being simulated; and the larger this absolute-value difference is, the more this pixel should be low-pass spatially filtered or blurred. This absolute-value difference of the two distances can be calculated, by way of example, as follows. The distance supplied from register 16 is applied as subtrahend to a subtracter 17 and as minuend to a subtracter 18. The distance supplied from portion 12 of image memory 10 is applied as minuend to subtracter 17 and as subtrahend to subtracter 18. A multiplexer 19 selects the positive-valued one of the differences supplied by subtracters 17 and 18, selection being controlled by the sign bit of either difference. Multiplexer 19 may comprise, by way of example, a first tri-state gate for selectively passing subtracter 17 output to digital multiplier 20 when and only when subtracter 18 output sign bit is ONE (indicating a negative number), and a second tri-state gate for selectively passing subtracter 18 output to digital multiplier 20 when and only when subtracter 17 output sign bit is ONE (indicating a negative number). Multiplexer 19 output is otherwise zero.

Multiplexer 19 output is multiplied in digital multiplier 20 by the reciprocal of aperture stored in register 26, to calculate the spatial bandwidth of the low-pass spatial filtering with which the full depth-of-focus pixel supplied from portion 11 of image memory 10 is to be convolved to blur that pixel. Multiplier 20 output is used to address a read-only memory 21 for looking up the kernel (or spatial-frequency response characteristic) of a one-dimensional low-pass spatial filter in sample-data format. The kernel sample-data are supplied to a convolver 22 for convolution with the full-depth-of-focus pixel sample supplied convolver 22 from portion 11 of image memory 10.

Convolver 22 output is written into portion 13 of image memory 10 as the first convolution proceeds. When the first convolution is completed, scanning generator 14 again generates numbers sequentially, but multiplexer 15 arranges for the portions 11, 12, 13 of image memory 10 to be scanned during the second convolution orthogonally with their scanning during the first convolution. The portion 13 of image memory 10 serving as a scan buffer is read to supply successive pixel samples to convolver 23. In convolver 23 each successive pixel supplied thereto is convolved therein with the low-pass spatial filter kernel, as supplied in sample-data from ROM 21 and as modulated in bandwidth responsive to distance data supplied from portion 12 of image memory 10, to supply a stream of pixels simulating camera response.

Figure 2:
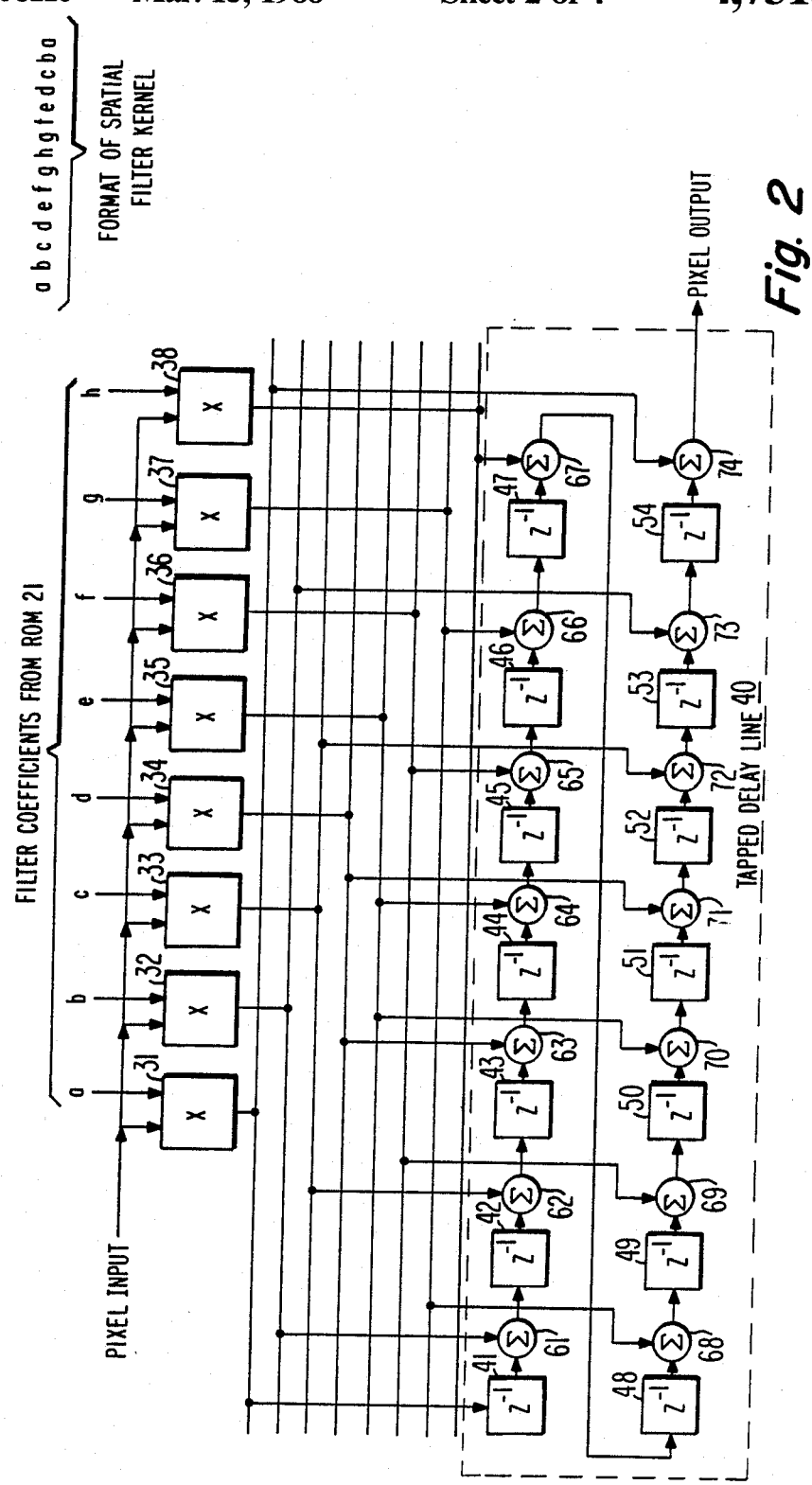
FIG. 2 is a block diagram of a convolver structure useful with FIG. 1 camera simulation system.

FIG. 2 shows in greater detail a suitable structure for convolver 22 or 23. The digital filtering configuration used in the convolver is preferably an input-weighted one if the filter bandwidth is to be varied at sample rate. FIG. 2 shows a digital filtering configuration which allows filter kernels up to fifteen samples wide. ROM 21 supplies the FIG. 2 convolver eight weighting coefficients denominated a–h, respectively. The spatial format of the filter kernel is as follows:

a b c d e f g h g f e d c b a.

For narrow-spatial-bandwidth filters the weights identified by letters earlier in the alphabet may be zero-valued. In any case, $2a+2b+2c+2d+2e+2f+2g+h$ is substantially constant-valued, to avoid variation in the apparent intensity of the simulated photographic image being generated by the spatial filtering. Each pixel in the stream of pixels supplied to the FIG. 2 convolver (from portion 12 or 13 of image memory 10) is multiplied by weighting coefficients a, b, c, d, e, f, g and h in digital multipliers 31, 32, 33, 34, 35, 36, 37 and 38 respectively.

A set of unit-sample delays 41–54 alternate in cascade connection with adders 61–74 to form a tapped delay line 40, to the taps of which clocked delay line the weighted pixels are applied. The stream of output pixels supplied from the end of delay line 40 is supplied to portion 13 of image memory 10 in convolver 22. In convolver 23 the stream of output pixels simulates the output of an electronic photographic camera.

There is a delay associated with passage of pixels through the FIG. 2 convolver. Consider, by way of example, how the delay introduced by convolver 22 can be handled where image memory 10 is addressed in Cartesian coordinates. In the first convolution the image is low-pass spatially filtered in the vertical direction. Accordingly, the portions of 11, 12, 13 of image memory 10 are scanned from top to bottom at relatively high rate and from left to right at relatively slow rate. Then, in the second convolution, the image is low-pass spatially filtered in the horizontal direction. The portions 11, 12, 13 of image memory 10 are scanned from top to bottom at relatively slow rate and from left to right at relatively high rate so convolver 23 provides a pixel stream that raster scans the camera field-of-view in accordance with conventional television practice. The delay in convolver 22 tends to introduce a vertical offset of several scan lines between image space as mapped into portion 13 of image memory 10 and as mapped into portions 11 and 12 of image memory 10, which during the second convolution tends to cause misalignment between image data supplied respectively from portion 11 and 13 of image memory 10.

A first solution to the problem is to introduce selectively, during first convolution, an offset in the column addressing of portion 13 of image memory 10 respective to the addressing of portions 11 and 12 of image memory 10. A second solution to the problem is to introduce selectively an offset in the row, or line, addressing of one of the portions 11, 13 of image memory 10 to align the image data respectively read from them during the second convolution.

The design of a camera simulation system as shown in FIG. 1 must also take into consideration that there can be edge effects associated with the convolution process. Edge effects occur in the case where a memory address coordinate is not cyclic in nature (i.e. does not cyclically repeat as the angular coordinate in polar coordinates does). This problem is handled through blanking appropriately—i.e., by underscanning the camera field-of-view in the unblanked portion of the output pixel stream simulating camera response.

In certain coordinate systems scale variancy of the coordinates must be taken into account. In Cartesian coordinates the coordinates have fixed scaling to image space, so this problem need not be considered. In polar coordinates, the radial coordinate has fixed scaling to image space; but the angular coordinate has a varying scale to image space, being proportional to the radial coordinate. If one performed a first convolution in the radial direction in a camera simulation system of the type shown in FIG. 1 using polar coordinates, an additional digital multiplication during the second convolution to scale the reciprocal aperture from register 26 for application to digital multiplication 20 might be used, in order to account for this scaling variation. To implement foveal-like camera response, for example, such an additional digital multiplication may be incorporated in a FIG. 1 system, although image memory 10 is addressed in Cartesian coordinates.

The FIG. 1 system is operable with gray scale information stored in portion 11 of image memory 10. Where color images are to be stored, FIG. 1 system can be modified to include cascaded elements 11, 22, 13 and 23 in triplicate. Each cascade can provide camera simulation for a respective primary color. The primary colors may be the additive primaries red, green and blue. Alternatively, the primary colors may be combinations of the additive primaries—e.g., the Y, I, Q primaries used in NTSC (National Television Standards Committee) broadcast television standards.

Multiplexing may be used in a variant of the FIG. 1 system to permit a single convolver to replace convolvers 22 and 23. Variants of the FIG. 1 system which use multiplexing to provide a continuous pixel stream for easy conversion to low-persistence kinescope display are possible, as will be apparent to the skilled digital television display monitor designer.

Where providing a continuous pixel stream for supporting a low-persistence kinescope display is of concern, however, it is usually preferable to arrange for nonseparable spatial filtering in the two-dimensional convolution process. Nonseparable two-dimensional spatial filtering has the advantage that one can obtain filter symmetry better than that available with separable two-dimensional spatial filtering. That is, the filter response can be made more uniform as a function of direction in image space.

Figure 3:
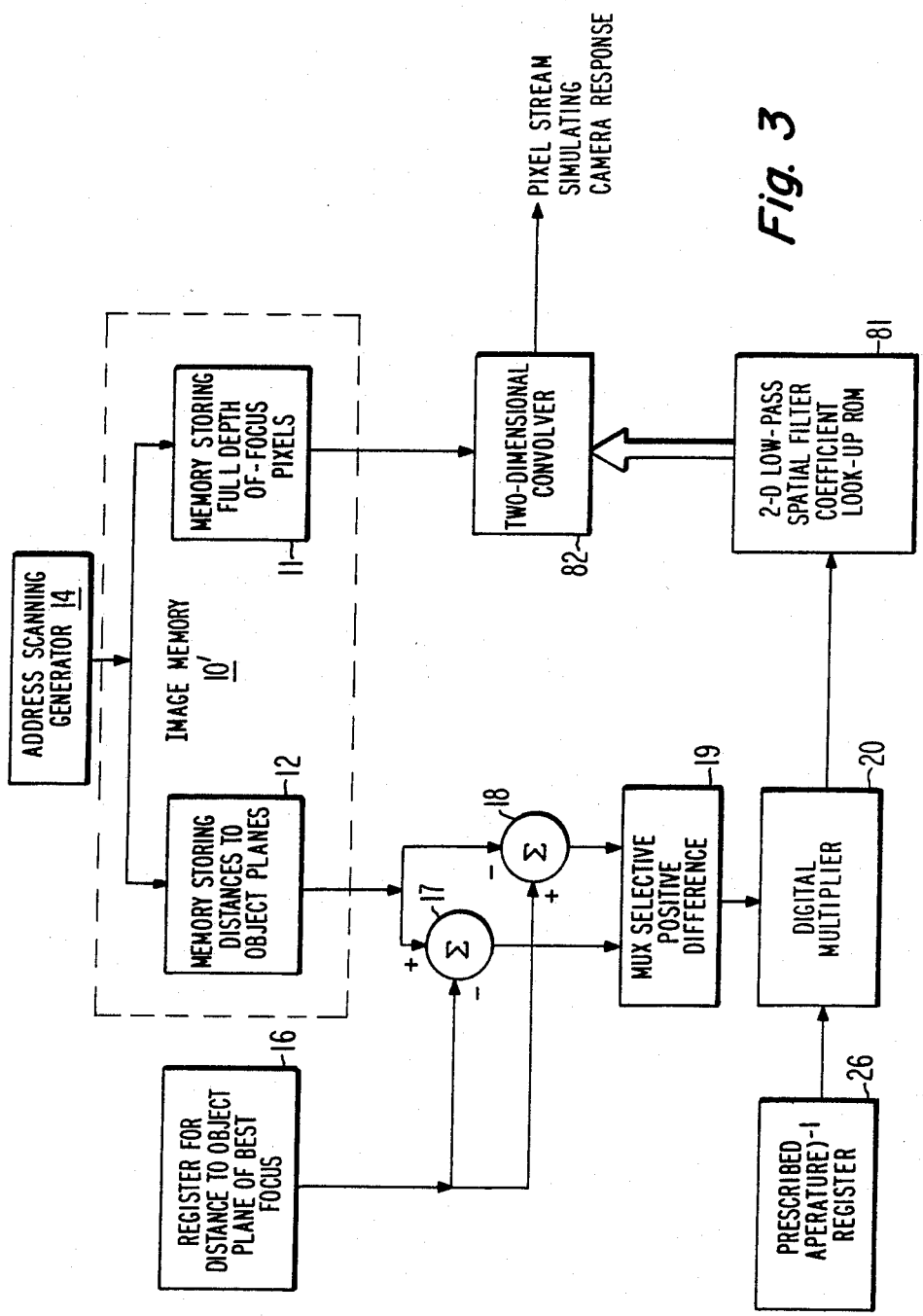
FIG. 3 is a block diagram of a camera simulation system embodying the invention and employing nonseparable, two-dimensional low-pass spatial filtering.

FIG. 3 shows a camera simulation system using nonseparable spatial filtering. Image memory 10' has portions 11, 12 but no scanning buffer memory portion 13.

The distance the surface of the object generating the pixel sample stored in portion 11 of image memory 10' is from the plane of best focus is supplied from digital multiplier 20 to a ROM 81 storing a look-up table of two-dimensional spatial filter coefficients. The kernel of seven-pixel-by-seven-pixel two-dimensional spatial filter, for example, has a spatial format as follows:

g h j a j h g
h f k b k f h
j k e c e k j
a b c d c b a
j k e c e k j
h f k b k f h
g h j a j h g The sum d+4(a+b+c+e+f+g)+8(h+j+k) is substantially constant-valued, to avoid variation in the apparent intensity of the simulated photographic image being generated by the spatial filtering. ROM 81 stores ten filter coefficients for each two-dimensional filter spatial bandwidth when a seven-pixel-by-seven-pixel spatial filter with octantal symmetry is used. When a fifteen-pixel-by-fifteen-pixel spatial filter is used, by way of counterexample, ROM 81 stores thirty-six filter coefficients for each two-dimensional spatial filter bandwidth. So, for large-kernel two-dimensional filters it may be preferable, from the standpoint of conserving digital hardware, to undersample filter response in ROM 81 and generate the omitted spatial samples of the kernel by two-dimensional spatial interpolation.

Pixel samples supplied by scanning portion 11 of image memory 10' are convolved with the low-pass spatial filter kernel as read from ROM 81 (either directly or with spatial interpolation). This is done in a two-dimensional convolver 82. The convolver 82 may resemble the one-dimensional convolver of FIG. 2 in its construction in that input-weighted digital filtering is employed. The tapped delay line structure is provided with the number of taps required for the square kernel. Certain of the delay elements are made to have delay corresponding to scan line length less filter kernel length, rather than unit delay. This provides a two-dimensional transversal filter in accordance with well-known digital filtering principles.

The FIG. 3 camera simulation system can be adapted for color imagery by replicating elements 11 and 82 for each of the primary colors. It should be understood that in the camera simulation systems thusfar described the information concerning the distance between the principal axis of the camera lens and objects in the field-of-view can be stored in portions 11 of image memories 10 in any one of many forms. An offset may be added to or subtracted from the distance in the data stored in portions 11 of image memory 10, for example, with means being provided for calculating the distances based on read-out from image memory portion 11. In camera simulation systems where the plane of best focus is not to be varied, the distances can be stored in terms of departure from plane of best focus, eliminating the need for elements 16–19.

In many camera simulation systems it is desirable to use designs that eliminate the substantial amount of read-only memory (e.g. in ROM 21 or 81) associated with storing low-pass spatial filter coefficients. Simple low-pass spatial filters can be provided by employing pixel-averaging techniques, but this type of filtering is essentially output-weighted in nature, rather than input-weighted. It is generally best to avoid output-weighted filtering in variable bandwidth filtering applications, because changing the filter bandwidth at any point in time causes pixel samples in transit through the filter to be incorrectly weighted, resulting in the pixel output of the filter being accompanied by undesirable alias components.

In any camera field-of-view being simulated, however, generally most objects have surfaces with a plurality of contiguous pixels at the same distance from the camera. So output-weighted filtering can be employed in further embodiments of the invention, particularly if care is taken to correct in substantial degree the aliasing that otherwise occurs at the boundaries between surfaces at different distances from the plane of best focus.

The inventor has implemented filtering procedures of this type in software for use on a general-purpose computer. In the main program an averaging process is used to blur objects in front of the plane of best focus and in back of the plane of best focus. In a separable spatial filtering procedure, image space is first scanned with directions of line sweep and line advance perpendicular to those used in conventional television raster scanning, then in accordance with conventional television raster scanning. If a pixel is in the object plane best focused on the lens image plane, or within prescribed distance from that object plane—i.e. in a zone of good focus—it is not altered. If a pixel is outside this zone of good focus, the pixel is assumed to be the center pixel in a window of pixels. The size of this window varies as a function of the absolute distance from object plane of best focus, ranging upward to fifteen pixels wide. If the center pixel is nearer to the camera than the zone of good focus, it is averaged with all other pixels in the window which are the same distance as it is from the principal axis of the camera lens. If the center pixel is further from the camera than zone of good focus, it is averaged with all other pixels in the window which are further from the camera than the zone of good focus. The prescribed distance from object plane of best focus, which defines the extent of the zone of good focus in front of and behind the plane of best focus, is directly related to the reciprocal of optical aperture of the camera lens system being simulated.

This main program works reasonably well for in-focus and background objects in the field of view, and for the edges between them. The surfaces of foreground objects are rendered properly except at their edges with in-focus objects, as long as these surfaces are at a uniform distance from the camera. Ancillary programs are then employed to correct for the aliasing introduced at these edges by the main program.

In a first of these ancillary programs, the enlargement of foreground objects due to being in front of the zone of good focus is simulated. The field of view is scanned to identify foreground pixels. The field of view is twice scanned, first with relatively high and slow respective scan rates in the column and row directions, then with relatively slow and high respective scan rates in the column and row directions. A fraction of each foreground pixel (e.g. one sixty-fourth to allow division by bit place shift) is added to each other pixel in a window flanking that foreground pixel, this being done subsequent to each flanking pixel being decremented by the same fraction of itself. Windows five pixels in length have been used successfully in emulating the enlargement of foreground objects at one distance from camera, for example.

A second ancillary program then smooths the edges of the foreground objects within their perimeters in image space. The memory storing a map of distances from principal axis to object planes is raster scanned, with a small dither scan superposed on the raster scan. Left-to-right dither on either side of the pixel selected by raster scan facilitates comparisons between stored distances drawn from memory to identify the pixel selected by raster scan being at the vertical edge of an out-of-focus foreground object. Top-to-bottom dither on either side of the pixel selected by raster scan facilitates comparison between stored distances drawn from memory to identify this pixel being a horizontal edge of an out-of-focus foreground object. Dither to bottom-right facilitates comparison to identify the pixel selected by raster scan being in a diagonal edge of an out-of-focus foreground object. When a pixel selected by raster scan is identified as being at an edge, it is replaced by a pixel averaging its intensity fifty—fifty with the average of the intensities of the immediately surrounding pixels.

A third ancillary program smooths the interface of the foreground objects and the remaining field of view in those portions of image space outside the perimeter of the foreground objects. Edge finding using data drawn from the memory storing a map of distances from principal axis to object planes in the field of view is again employed. Each pixel abutting the edge of a foreground object, but not included in that foreground object, is replaced by a pixel having an intensity equal to the average of the intensities of the replaced pixel and the immediately surrounding pixels.

One should note that this software treats out-of-focus foreground objects differently than out-of-focus background objects. This is done to take into account the fact that the blur surrounding a pixel representative of an object plane further from the camera than the zone of good focus is eclipsed by other pixels. I.e., as can be shown by graphic constructions made in accordance with the principles of geometric optics, portions of the light energy associated with a full field-of-focus background pixel do not reach the camera. This effect is not taken into account in the FIG. 1 and FIG. 3 camera simulation systems as thusfar described.

Figure 4:
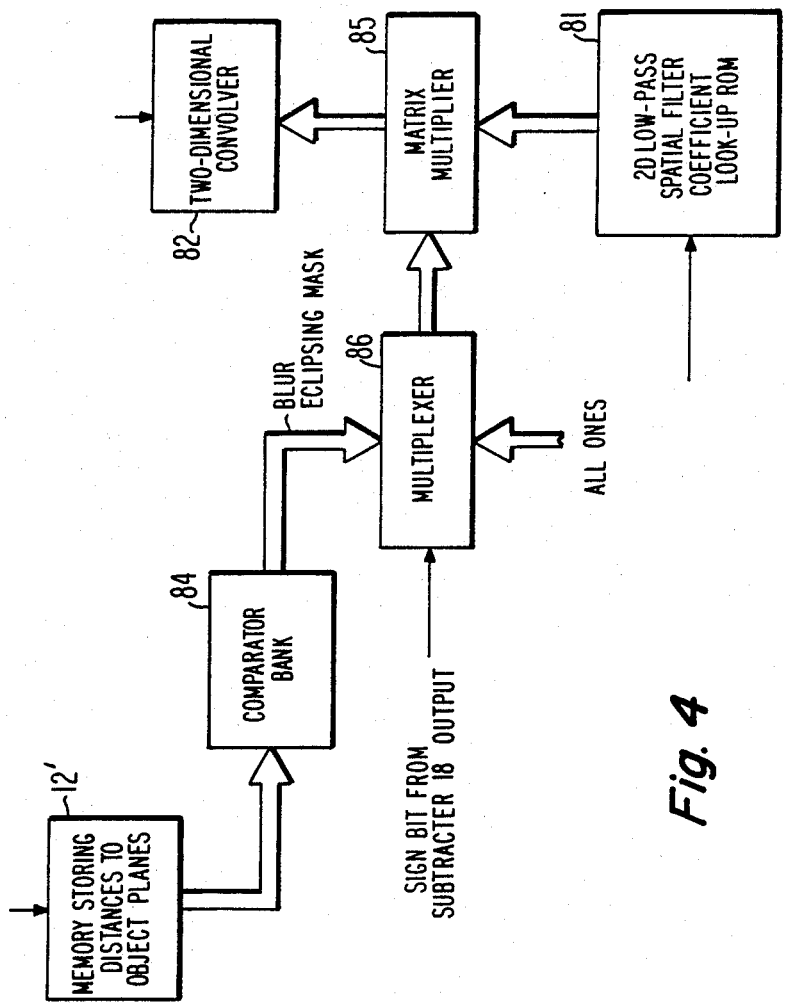
FIG. 4 is a block diagram of an improvement in the FIG. 3 camera simulation system that provides for the eclipsing of the blur from an object plane by an object in an object plane closer to the camera lens being simulated.

FIG. 4 shows how the FIG. 3 camera simulation system is modified to take ecliptic effects properly into account. The portion 12 of image memory 10 that stores distances to object planes is replaced by a window-scanned memory 12' such as that described by L. A. Christopher et al. in U.S. Pat. No. 4,460,958 issued July 17, 1984, entitled "WINDOW-SCANNED MEMORY" and assigned to RCA Corporation. The window-scanned memory 12' supplies a bed of samples including distance to the object plane of the pixel to be convolved (applied to input of subtracters 17 and 18) and the distances to the object planes of surrounding pixels. This bed of samples has the same dimensions in number of sample points as the maximum-size two-dimensional low-pass spatial filter kernel. These samples are supplied to a bank 84 of comparators, each comparator comparing the distance of the object plane of the pixel to be convolved with the distance of the object plane of one of the pixels surrounding it. Each comparator output is a ZERO if the distance of the object plane of the pixel to be convolved is the larger distance, and is otherwise a ONE. This matrix comparison generates an eclipsing mask descriptive of the perimeters in image space of objects in front of that object plane. The central sample in this eclipsing mask is invariably a ONE.

A matrix multiplier 85 is interposed between ROM 81 and the two-dimensional convolver 82 to multiply each of the low-pass spatial filter coefficients read from ROM 81 by a respective multiplier.

If the sign bit from subtracter 18 be positive, indicating the pixel to be convolved is not a background pixel which is to be blurred, a multiplexer 86 selects a ONE for each of these multipliers. FIG. 3 camera simulation system then operates as already described.

But if the sign bit from subtracter 18 be negative, indicating the pixel to be convolved is a background pixel which is to be blurred, multiplier 86 selects the eclipsing mask supplied by the bank 84 of comparators as matrix multiplicand applied to matrix multiplier 81. This reduces to zero, in matrix multiplier 85 output, certain of the filter weights for being convolved in convolver 82. These filter weights are associated with points in the sample matrix that are occupied, or will be occupied, by foreground pixels or pixels in the zone of good focus.

What is claimed is:

1. Apparatus for electronically generating reduced depth-of-focus images, comprising:
   a memory having storage locations addressed in two-dimensions which map two orthogonal dimensions in an image space, each addressable storage location in said memory storing a digital word, a first portion of which word is a sample of the intensity of full-depth-of-focus image, and a second portion of which word is the distance between the camera and the portion of said full-depth-of-focus image described by the first portion of that word;
   means for reading from storage locations in said memory in a sequence corresponding to a scanning of image space;
   means convolving the first word portions read from storage locations in said memory with an adjustable-bandwidth low-pass spatial filtering kernel for generating samples of a selected one of said reduced-depth-of-focus images in which foreground and background pixels are blurred and their blurs are superposed on surrounding pixels; and
   means for adjusting, in accordance with a selected one of prescribed relationships, the spatial bandwidth of said low-pass spatial filtering kernel responsive to the second word portions read from storage locations in said memory.

2. Apparatus as set forth in claim 1 wherein said means for adjusting the spatial bandwidth of said low-pass spatial filtering kernel includes:
   means for calculating from the second word portions read from storage locations in said memory how the blur of each background pixel is eclipsed by other pixels; and
   means for adjusting the spatial bandwidth of said low-pass filtering kernel to provide for eclipsing the blur of background pixels by said other pixels.

3. A method for electronically generating images of controlled focus and depth-of-focus, said method comprising the steps of:
   mapping a camera field-of-view in memory, providing for each of selected points in image space a datum concerning the intensity of image at that point and a datum concerning the distance between the principal axis of the camera lens and the object plane of that point:
   scanning said memory during reading thereof;
   convolving an adjustable-bandwidth low-pass spatial filtering kernel and the data that scanning the memory during reading thereof supplies concerning the intensity of image, for generating samples of said images of controlled focus and depth-of-focus; and
   adjusting the spatial bandwidth of said low-pass spatial filtering kernel responsive to the data that scanning the memory during reading thereof supplies concerning the distance between the principal axis of the camera lens and the object plane.

4. A method for electronically generating images as set forth in claim 3 including the further steps of
   comparing, the distance between the principal axis of the camera lens and the object plane of that sample in image space at which the center of said low-pass spatial filtering kernel currently falls during said step of convolving, with the distances between the principal axis of the camera lens and the object planes of surrounding samples;
   generating an eclipsing mask based on those comparisons;
   ascertaining when a datum concerning the intensity of image is associated with a datum concerning the distance between the camera lens and object plane greater than that associated with good focus, thereby to identify a background pixel; and
   modifying said low-pass spatial filtering kernel by said eclipsing mask whenever a background pixel is so identified.

* * * * *